US008407028B2

(12) United States Patent
Sieracki

(10) Patent No.: US 8,407,028 B2

(45) Date of Patent: Mar. 26, 2013

(54) INDIRECT MONITORING OF DEVICE USAGE AND ACTIVITIES

(76) Inventor: Jeffrey M. Sieracki, Silver Spring, MD (US)

( * ) Notice: Subject to any disclaimer, the term of this patent is extended or adjusted under 35 U.S.C. 154(b) by 61 days.

(21) Appl. No.: 13/049,867

(22) Filed: Mar. 16, 2011

(65) Prior Publication Data

US 2011/0224950 A1 Sep. 15, 2011

Related U.S. Application Data

(63) Continuation-in-part of application No. 11/387,034, filed on Mar. 22, 2006, now Pat. No. 8,271,200, which is a continuation-in-part of application No. 10/748,182, filed on Dec. 31, 2003, now Pat. No. 7,079,986.

(60) Provisional application No. 61/314,575, filed on Mar. 16, 2010.

(51) Int. Cl.
*G06F 15/00* (2006.01)

(52) U.S. Cl. ........................................................ 702/189

(58) Field of Classification Search .................. 702/160, 702/189; 600/301, 511; 607/59
See application file for complete search history.

(56) References Cited

U.S. PATENT DOCUMENTS

| | | | | |
|---|---|---|---|---|
| 6,751,498 | B1 * | 6/2004 | Greenberg et al. | 600/511 |
| 6,952,662 | B2 | 10/2005 | Wegerich et al. | |
| 7,020,701 | B1 | 3/2006 | Gelvin et al. | |
| 7,079,986 | B2 * | 7/2006 | Sieracki | 702/189 |
| 7,552,030 | B2 | 6/2009 | Guralnik et al. | |
| 7,993,269 | B2 * | 8/2011 | Donofrio et al. | 600/309 |
| 2003/0058339 | A1 | 3/2003 | Trajkovic et al. | |
| 2006/0064037 | A1 | 3/2006 | Shalon et al. | |
| 2007/0167853 | A1 * | 7/2007 | Melker et al. | 600/532 |
| 2008/0170623 | A1 | 7/2008 | Aharon et al. | |
| 2008/0228446 | A1 | 9/2008 | Baraniuk et al. | |
| 2009/0072985 | A1 | 3/2009 | Patel et al. | |

FOREIGN PATENT DOCUMENTS

| | | |
|---|---|---|
| GB | WO2008142386 | 11/2008 |
| IL | WO2009144721 | 12/2009 |

OTHER PUBLICATIONS

Tropp, Joel; Greed is Good: Algorithmic Results for Sparse Approximation; IEEE Transactions on Information Theory, vol. 50, No. 10, Oct. 2004, pp. 2231-2242.

* cited by examiner

*Primary Examiner* — Bryan Bui
(74) *Attorney, Agent, or Firm* — Edell, Shapiro & Finnan, LLC

(57) ABSTRACT

Signal characteristics, or signatures, defined by one or more forms of energy being transferred during the commission of an activity are captured in dimensionally-reduced numerical sequences. Dimensionality reduction is achieved such that reduced data acquired during a detection phase can be directly compared with such reduced data produced during system training. Activities, events, human identities and so on can be identified through such direct comparison. Dimensionality reduction, such as through sparse approximation or simultaneous sparse approximation, may produce combinations of scaled prototype functions. Such combinations or their parametric representations compactly describe the signal characteristics for purposes of discovering new activity signatures, of extracting test signals from a set of measurements and of comparing sets for purposes of detection and classification.

41 Claims, 9 Drawing Sheets

INDIRECT MONITORING OF DEVICE USAGE AND ACTIVITIES

CROSS-REFERENCE TO RELATED APPLICATIONS

This application is a Continuation-in-Part of U.S. patent application Ser. No. 11/387,034, entitled, "System and Method for Acoustic Signature Extraction, Detection, Discrimination, and Localization," filed on Mar. 22, 2006, which is a Continuation-in-Part of U.S. patent application Ser. No. 10/748,182, entitled, "Greedy Adaptive Signature Discrimination System and Method," now U.S. Pat. No. 7,079,986, filed on Dec. 31, 2003. The above referenced applications are incorporated by reference herein in their respective entireties as if fully set forth in this Disclosure. The benefit of priority from these applications is claimed herewith to the extent legally applicable. This application further claims benefit of priority from U.S. Provisional Patent Application Ser. No. 61/314,575, filed on Mar. 16, 2010, the disclosure of which is incorporated herein by reference.

BACKGROUND

The present general inventive concept is directed to signal processing and signal signature detection particularly to determine the presence and/or type of activity in the region of interest. For example, the present general inventive concept may implement means by which the use particular devices in a particular area, structure, vehicle, etc., can be detected and identified, as well as identifying individuals that may be operating such devices. Whereas systems for activity detection and surveillance may exist in various forms, such systems are typically configured to detect and identify a limited number of conditions and/or activities and do so typically by direct observation or measurement of the activity. Moreover, certain related systems typically implement sensors to detect only a few forms of energy so as to minimize computational resources needed to evaluate a broad range of energy forms. The present general inventive concept overcomes the limitations in the related art through, among other things, robust data reduction techniques through which signals corresponding to a wide range of energy modalities can be, among other things, identified, classified, compared and correlated. Moreover, the signals used to determine device use and/or activity may be obtained from energy incidental to the device use and/or activity without specifically instrumenting or directly observing each activity, each device or actor.

SUMMARY

The present general inventive concept provides machine-implemented means by which dimensionally reduced signals corresponding to different forms of energy may be used to identify activities, individuals, events, etc., without necessarily outfitting the signal sources with specific detectors beforehand. Identifying signatures may be derived from ancillary or spurious energy transferred during the commission of an activity to sensors of different energy modalities.

The foregoing and other utility and advantages of the present general inventive concept may be achieved by a monitoring apparatus including a plurality of sensor channels to produce numerical sequences proportional to energy transferred to respective sensors thereof during commission of an activity. A signature detector determines whether a known activity is committed by matching dimensionally-reduced representations of the numerical sequences with dimensionally-reduced representations of known numerical sequences containing signal characteristics defined by energy transference in the commission of the known activity. An indication of the known activity is provided upon positive determination of the match.

The foregoing and other utility and advantages of the present general inventive concept may also be achieved by monitoring apparatus having sensors to produce signals proportional to energy transferred in committing an activity. A plurality of sensor channels coupled to the sensors produce numerical sequences proportional to the energy. A processor determines whether a known activity is committed by matching the numerical sequences with known numerical sequences containing signal characteristics defined by the energy transference in the commission of the known activity. An indication of the known activity is provided upon a positive determination of the match.

The foregoing and other utility and advantages of the present general inventive concept may also be achieved by a machine-implemented method for monitoring a region of interest. A set of signature representations is formed as dimensionally-reduced numerical sequences containing signature signal characteristics defined by energy transference in committing a known activity. Energy that is transferred during commission of an activity is converted into electrical signals having activity signal characteristics and the electrical signals are converted into numerical sequences that represent the activity signal characteristics. The numerical sequences are dimensionally-reduced into representations thereof and the representations are directly compared with the signature representations to obtain a similarity measure between the activity signal characteristics and the signature signal characteristics. The activity is reported as the known activity upon a positive determination that the similarity measure meets a predetermined criterion.

BRIEF DESCRIPTION OF THE DRAWINGS

These and/or other aspects and utilities of the present general inventive concept will become apparent and more readily appreciated from the following description of exemplary embodiments, taken in conjunction with the accompanying drawings, of which.

DETAILED DESCRIPTION

Figure 1:
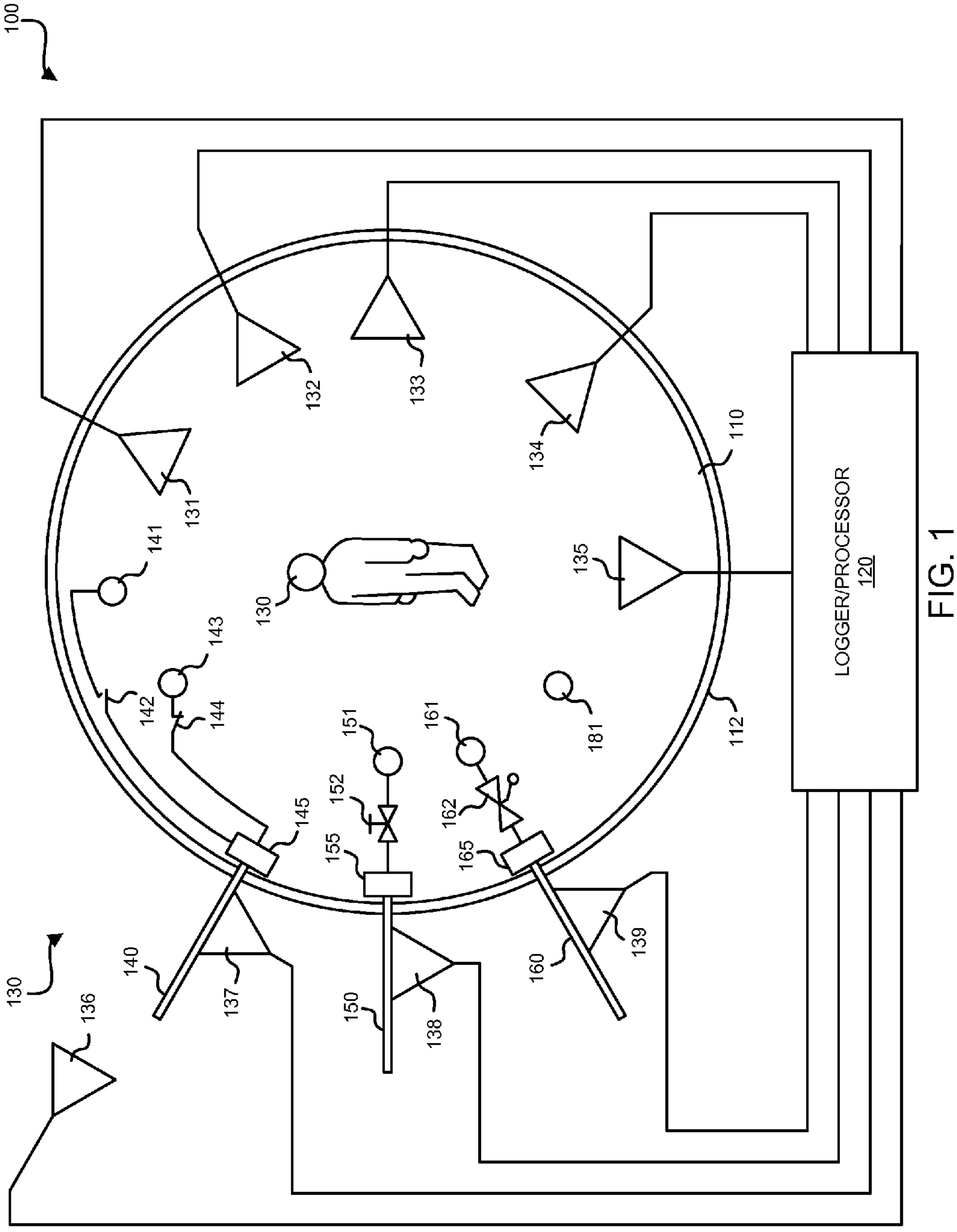
FIG. 1 is a diagram illustrating a region of interest monitored by an exemplary embodiment of the present general inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Referring to FIG. 1, there is illustrated an exemplary monitoring system 100 by which the present invention may be generally described. Exemplary monitoring system 100 is configured to monitor activities within a region of interest (ROI) 110, to identify such activities, and/or identify subjects, representatively illustrated as human 170, performing the activities and/or that are responsible for such activities taking place. As used herein, the term activity refers to any action on or within ROI 110, the presence of which is identifiable by a detectable transference of energy. In certain embodiments of the present invention, the activities being monitored and/or identified are local to ROI 110 and, as such, ROI 110 is to be considered as being contained within a boundary 112. Boundary 112 may be a physical structure, such as walls of a building or the confines of a vehicle cabin. However, it is to be understood that boundary 112 need not be a physical boundary. For example, boundary 112 may be defined as the extent to which monitoring system 100 is capable of obtaining useful data, as established by the application for which the present invention is embodied. It is to be understood further that ROI 110 may by partitioned by other structures within a defined boundary.

Exemplary monitoring system 100 includes one or more sensors 131-139, the complete set of which will be collectively referred to herein as sensor system 130, deployed in and about ROI 110. It is to be understood that whereas only nine (9) sensors are illustrated in FIG. 1, more or fewer sensors may be deployed as dictated by the application for which the present invention is embodied. Sensors 131-139 obtain data over a set of energy modalities, where a modality, as used herein, refers to a manifestation of energy as it is transferred to a transducer suitably constructed to quantify such energy for purposes of machine-implemented processing. For example, in one modality, acoustic waves may be transferred to, say, a microphone to produce an electrical signal, which, in turn is converted a series of numbers through a sampling process. In another modality, electromagnetic waves (or, equivalently, quanta) may be transferred to, say, a suitable antenna and receiver combination, into an electrical signal and, subsequently converted into a series of numbers. The present invention is neither limited to any particular set of energy modalities nor to the types of transducer systems used to convert the energy into a form that can be processed by a machine. It should be understood that sensor system 130 may include one or more contact sensors, which, as used herein, refers to sensors that require direct contact with the object being measured and one or more standoff sensors, which, as used herein, refers to sensors that acquire data without direct contact with the object being measured. Certain embodiments of the present invention may further utilize proximal sensors, which refers to any sensor located so close to the activity or device as to largely remove any ambiguity as to the source of the incident energy. In certain applications, a contact or proximal sensor may be used to enhance training by providing characteristic signal patterns that are highly correlated to the energy source. Thus, as described below, data from standoff sensors, which typically receive less energy and at a much poorer signal-to-noise ratio, can be correlated and processed against the proximal sensor data to discover and thereafter utilize signal characteristics that might otherwise be too weak and hidden in noise to be obvious to a human or machine observer.

The term appliance will be used herein to refer to items in ROI 110 from which signals can be obtained by monitoring system 100. An appliance may be a device that can be manipulated and/or utilized by a subject 170 in the commission of an activity. Other appliances require no such interaction with subject 170, but such appliances may nevertheless have some impact of interest on ROI 110 that can be detected through an energy form manifested by its presence or operation. The ordinarily skilled artisan will recognize a wide variety of devices that fit the definition of an appliance upon review of this disclosure.

As illustrated in FIG. 1, certain appliances rely on a power source outside ROI 110. For example, ROI 110 may be provided with an electrical service 140 to operate appliances 141, 143, a compressed fluid service 150, such as natural gas to operate appliance 151, and water service 160 to operate appliance 161. Each service 140, 150, 160 may include a distribution system 145, 155, 165, respectively, to distribute proper levels of power to various appliances on a corresponding circuit. The appliances 141, 143, 151, 161 are selectively connected to the corresponding distribution system through a suitable actuator; electrical appliances 141, 143 may be selectively connected to distribution system 145 through respective switches 142, 144, natural gas appliance 151 may be selectively coupled to distribution system 155 through a valve 152, and water appliance 161 may be connected to distribution system 165 through a float valve 162. In certain embodiments of the invention, service feeds 140, 140, 160 are monitored via sensors 136-139 for changes that may result from activities inside ROI 110. When so embodied, the present invention can utilize sensor signals, such as those that reflect changes in temperature, pressure, electrical current, voltage, etc., to determine an associated activity within ROI 110.

Certain other appliances are independent of outside service feeds, such as service feeds 140, 150, 160, and may be powered by an internal power source, such as a battery. Other appliances may only require mechanical motivation, such as a force applied by user 170, or some other means to be operated. Such appliances representatively illustrated in FIG. 1 by appliance 181.

According to achievable benefits of the present invention, monitoring system 100 may utilize signals obtained from spurious energy incidental to operation of an appliance, i.e., indirectly, as opposed to by direct observation of work done by the appliance. This is best explained by an example; consider the operation of an electric drill. In an initial time period, the drill is switched on at which time several distinct energy modalities can be detected by suitable sensors. A voltage surge results in the voltage supply circuit due to counter-electromotive force (EMF) of the drill motor, spurious electromagnetic (EM) emissions may result from such voltage surge, as well as from electrical arc sparks from closing the trigger switch, time-varying acoustic emissions arise from spinning-up the drill motor, and EM emissions, acoustic emissions and light may be emitted from the motor housing due to electrical arcing within the motor. These phenomena occur within a short time period, but not necessarily simultaneously. In a second time period, the drill motor may reach steady rotation, at which point the startup voltage surge has decayed and with it the associated energy modalities. In this time period, the drill motor may produce acoustic, magnetic, and RF emissions that are relatively constant reflecting the steady state unloaded spin of the drill motor. At some later point, the user may begin drilling a work piece, at which point another set of signals may be acquired. The resistance of the drill bit in the work piece slows the drill motor and, once again, counter-EMF produces a voltage surge and the associated energy emissions. Such resistance of the drill bit in the work piece, which is caused by friction, may generate time-varying thermal emissions. Acoustic emissions may reflect the time-varying load on the drill motor as the drill bit proceeds through the work piece, and so on. As the drill is switched off, the acoustic emissions cease and the stored energy in the motor's coils may be dissipated across the opened switch contacts, thereby producing another RF spike of detectable, if not substantial energy. It is to be fully noted and appreciated that the aforementioned energy modalities are incidental to operating a drill and are not necessary to actual work being done by the drill. That is, if these phenomena could be avoided, e.g., counter-EMF did not cause voltage surges, the drill would still function as a drill. Clearly, a drill that is operated in a vacuum where acoustic energy cannot be transmitted would still operate as designed.

The present invention is not limited by the sensor types implemented in sensor system 130. Sensors may be chosen based on requirements of the particular application for which the present invention is embodied. The ordinarily skilled artisan will readily recognize numerous and varied sensor types that can be used in conjunction with the present invention without deviating from the spirit and intended scope thereof. Certain sensor types may be illustrated and described below for purposes of explanation and not limitation.

Sensors 131-139 may be communicatively coupled to a logger/processor 120, by which signals generated by sensors 131-139 are processed and analyzed in accordance with the present invention. Exemplary logger/processor 120 may contain a set of data structures containing identifiable signatures for each device, tool, or activity of interest may be constructed, such as per the processes described in the inventor's US Patent Application Publication 2006/0241916, entitled, "System and Method for Acoustic Signature Extraction, Detection, Discrimination, and Localization," and U.S. Pat. No. 7,079,986, entitled, "Greedy Adaptive Signature Discrimination System and Method," both of which are incorporated herein by reference and are collectively referred to herein as the Incorporated Disclosure. As used herein, a signature is a collection of signal features, or representations thereof, that when taken as a group, including the case where a single signature is generated to be representative of such a group, can be used to distinguish different activities, once monitoring system 100 has been properly trained therefor. Exemplary logger/processor 100 may construct a candidate signature from the signals produced by one or more sensors 131-139 and compare the candidate signature with those of the previously described set. If a signature match is identified, logger/processor 120 may record and/or report the activity, device usage, event, etc., that was associated with the signature during the training process. It is to be understood that signatures may be formed at different levels of granularity, such as by denoting an action in general, e.g., turning on a light, an action by a specific actor, e.g., Bob turning on a light, a state of activity, e.g., watching television, or an activity that is a summation of several actions, e.g., making dinner. As another example, energy of a footfall may define a signature, energy of repeated footfalls, such as by a subject walking, may define another signature, and energy resulting from a specific pattern of footfalls, such as by a particular individual walking, may define yet another signature. Additionally, a signature may be constructed to associate one or more signals to an occupancy state in ROI 110, e.g., human presence or, more specific state, such as a particular number N vs. more than N persons in ROI 110. A signature may also be associated with a specific location or appliance, such as, "the light in the bedroom", by virtue of specific emissive or transmission channel characteristics that are capture by the appropriate sensors.

Certain signatures can be acquired by time-difference-of-arrival processing of energy from multiple sensors or by signal changes caused by the transmission channel over which the energy must travel. Thus, if a particular light switch, as well as its connected wiring and bulb, is known to have a range of typical radio frequency (RF) signature emissions when switched on, the energy measured at a standoff sensor will, with high probability, appear as one instance of this typical RF signature emission convolved with the channel properties of the path by which the energy reaches the sensor. This can differentiate the operation of one particular light switch from others. Once an embodiment of the present invention has been trained to its environment, the common signature characteristics that indicate any light switch being turned on can be tracked, while the operation of individual light switches can be differentiated through its own variant signature caused by the particular transmission path.

Various levels of training monitoring system 100 may be performed in order to tune operation thereof to a specific environment. For example, data samples corresponding to different forms of energy may be collected and, by methods such as those described in the Incorporated Disclosure, a signature can be discerned for the activity for which monitor system 100 is being trained. Under certain training conditions, it may be necessary to provide an indication that an activity for which the system is being trained is beginning or is underway, where such state of an activity is referred to herein as an event. For example, when a system constructed in accordance with the present invention is being trained to identify, say, a drill motor being activated, the system may require knowledge of when the drill motor is activated, such as when energy of multiple modalities associated with the drill motor being activated are being used to identify the activity. Such an indication is referred to herein as a marker. A marker need not indicate the onset of an activity; it need only correspond to a repeatable event by which commission of the activity can be identified. Moreover, a marker need not necessarily be temporal; it may be a location in space, for example, when energy modalities are spatially aligned during training. In certain embodiments of the present invention, an approximate time correlating marker of the event of interest may be associated with the data samples from different sensors, and signals associated with a single event may be correlated, at least coarsely. When so processed, the resulting signature may comprise identifying data across energy modalities from which the signals were taken, which may be in the form of, for example, commonly occurring patterns of transient dynamics, commonly present background noise, stationary signal states, etc. Thus, during training, a contact sensor, for example, may be used to obtain a marker, such as, say, a pressure sensitive switch on the trigger of an electric drill, and signals from the subsequent energy modalities resulting from the start-up of the drill, such as those described above, may be aligned to the pressure marker activated by a user operating the drill. The system can be trained to recognize the drill startup strictly from energy modalities of standoff sensor signals, at which time the pressure switch signal can be removed from the signature associated therewith. Thereafter, if a new sensor is added, for example, and new signal characteristics are to be added to a drill startup signature, the marker for such training may be obtained from the standoff sensors for which the system was previously trained. That is, the pressure sensor signal need not be reintroduced into the training process.

Signature refinement may be achieved by a second level of training that may be performed at the point of deployment. For example, a set of known lab-acquired signatures may be used to seed an on-site incremental training process, whereby a set of signatures that are more closely tuned to a particular environment, specific target devices, and specific sensors is created by processes similar to those in the first stage of training. Considering a specific example, electrical wire-carried signatures are often fairly consistent by device and, as such, an electrical sensor may be used to generate a correlative marker for sensors of other energy modalities such as acoustic/vibratory sensors or RF sensors. Training signals in such a scenario may be obtained by, for example, plugging a load device into a particular power supply or ground circuit throughout the duration of first level training so that signal transients generated by activities of interest can be used as coarsely classified event markers during on-site, second level training. The initial signature set is only required to contain data sufficient to distinguish events of interest from background energy and to coarsely classify them. Each subsequent data collection cycle may be refined with those of previous cycles, using the correlative event markers, to produce a more finely tuned database for a given installation. Once such training has been completed, the original load device can be optionally removed and signature detection can proceed via the other energy modalities captured during the training cycle.

In accordance with achievable benefits of the present invention, multiple energy modalities can be used in detecting and classifying events and activities, thereby leading to lower false positive rates than would otherwise be achieved by using a single energy modality. Thus, in the aforementioned training process, the original load device need not be disconnected after training and may instead be left attached to the electrical feed circuit with the expectation that secondary energy modalities, e.g., RF, can be used to incrementally improve error rates in detection and classification as training and monitoring simultaneously proceed. However, if the primary training sensor is removed, once a signature obtained through an alternative sensor channel is discovered and determined to be a reliable marker, the alternative marker may replace that of the original primary sensor. In certain embodiments of the present invention, the system may discover new signatures from the same or other energy modalities by chaining discovered signature information with one marker training the next. With repetition, certain embodiments of the present invention may refine representations of any given signature by the inclusion of more and more sample vectors of the same class, thereby resulting in a finer tuned system at the deployment point, as well as adapting to changing conditions or differences in newly introduced actors.

Figure 2:
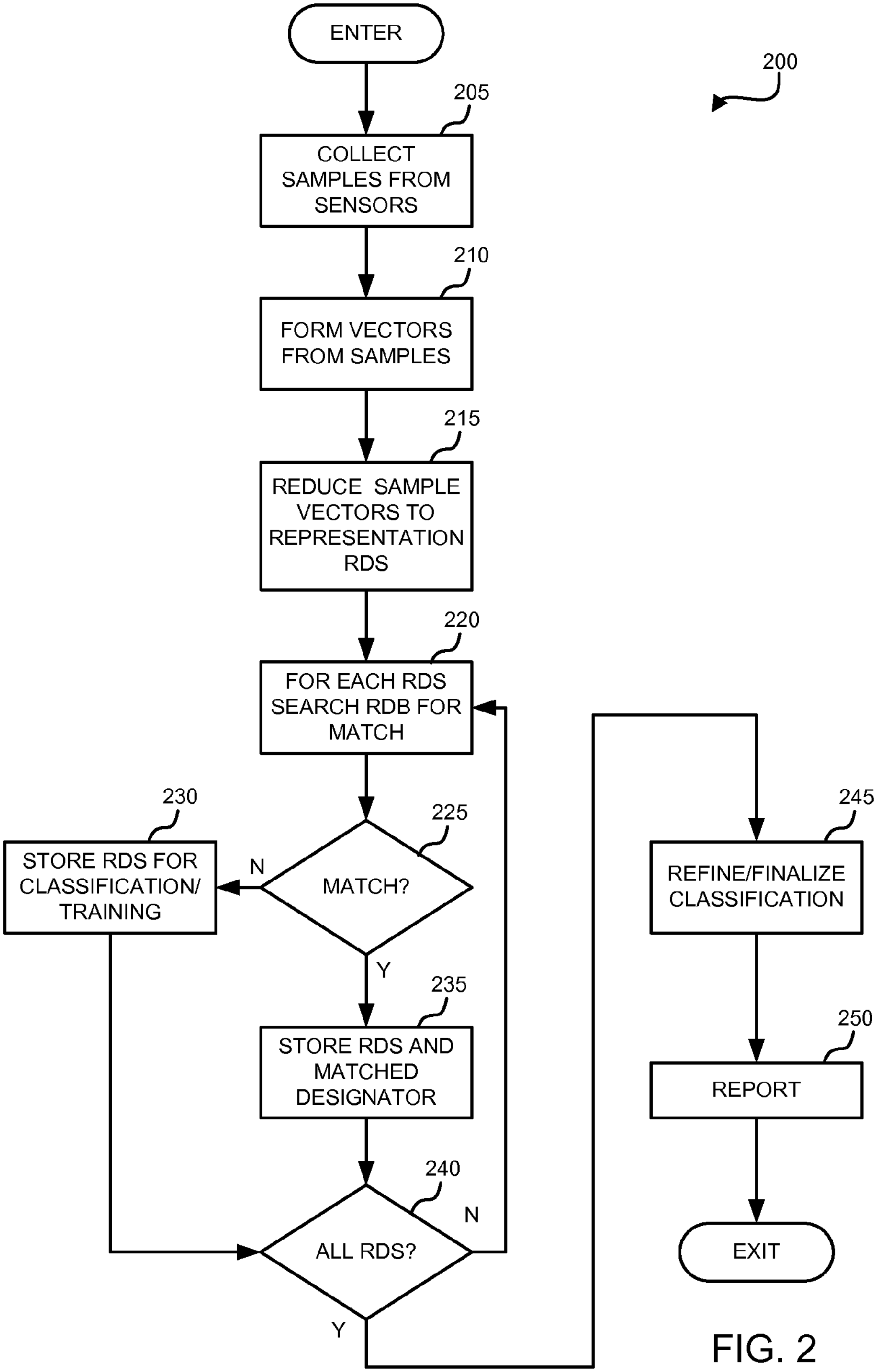
FIG. 2 is a flow diagram of an exemplary monitoring process for which the present general inventive concept may be embodied.

Referring now to FIG. 2, there is illustrated a flow diagram of an exemplary monitor process 200 that may be implemented by logger/processor 120 described with reference to FIG. 1. Upon entry, exemplary process 200 transitions to operation 205, whereby outputs of sensors 131-139 are sampled to form respective streams of numerical values. This may be achieved by a suitable circuitry or processing, such as that described below. Process 200 may then transition to operation 210, whereby sample vectors $X=\{x_1, x_2, \ldots, x_N\}$ are formed from the numerical streams. The length N of the vectors X may be established in accordance with properties of the signal and independently of those from different sensors, as described more fully with reference to FIG. 4. Alternatively, the length of the vectors may be fixed by a time window of predetermined length, by periodic or sliding windows, invoked by a predetermined trigger condition, and so on. The present invention is not limited by a particular sample vector formation scheme and the skilled artisan will recognize techniques not described herein that may nevertheless be used in conjunction with the present invention without departing from the spirit and intended scope thereof.

Upon forming the sample vectors X, exemplary process 200 transitions to operation 215, whereby the sample vectors X are dimensionally reduced. As used herein, dimensionality reduction (DR) refers to reducing the signal space to a lower order representation space. For example, two vectors $X_1$ and $X_2$ may both have a time dependence since the sampling of the signal generally occurs over an interval of time; however the time intervals, i.e., the respective lengths of the vectors, may be substantially different. Such vector length differences may complicate signal comparison for purposes of activity detection and classification. Moreover, the sample vectors $X_1$, $X_2$ may represent signals from a common source, but sampled from different energy modalities. This, too, may complicate signal comparison, especially when the signals must be compared in the time domain. In certain embodiments of the present invention, the sample vectors X, regardless of dependence on, for example, time, vector length, energy modality, etc., are dimensionally reduced to respective combinations of scaled prototype functions, e.g., $$f(t)=\sum_{i=1}^{k} a_i g_i(s)+\xi \qquad (1)$$

In equation (1), f(t) is the signal represented by the sample vector X that is being dimensionally reduced, t parameterizes the sensor signal domain, s parameterizes the prototype function domain, $a_i$ are scaling coefficients, $g_i(s)$ are prototype functions and $\xi$ is a residue. It is to be understood that either or both of t and s may be multidimensional, e.g., may be a vector of parameters by which the corresponding domain is mapped. Moreover, it is to be noted the f(t) may represent a continuous function, whereas the corresponding signal is represented by a discrete number sequence, i.e., the sample vector X.

Such dimensionality reduction mathematically presented in equation (1) will be referred herein to as Sparse Approximation (SA), which is briefly described below. A representation data structure (RDS) may be constructed that contains a list of the scaling coefficients and the associated prototype functions, or an indication thereof, by which other such structures may be compared. A full description of the inventor's SA, as well as the inventor's Simultaneous Sparse Approximation (SSA) is given in the Incorporated Disclosure. It is to be understood, however, that the present invention can be embodied without dimensionality reduction, whereby signatures collected from sensors of one or more energy modalities are compared by suitable signal similarity metrics and processes in the appropriate signal domain.

In operation 220-240, a match for each RDS is sought for in an RDS database (RDB). Such a database may contain RDSs that were constructed during a training process during which RDSs of known signals corresponding to various anticipated activities in ROI 110 were obtained. As such, the RDB is populated with RDSs that contain the known signatures, which may be stored in the RDB along with designators indicative of the respective activities from which the signals were generated. Such an association of an RDS and a designator of a corresponding activity on which the RDS was trained is referred to herein as a signature RDS (SRDS).

A match, as used herein, occurs when at least two RDSs meet some predetermined similarity criteria. For example, the RDB may be searched via, for example, a nearest-neighbor process to find a signature RDS that matches an RDS under scrutiny. A distance metric may be applied to determine whether the RDS under scrutiny is proximal, say, to within a predetermined threshold distance, to its nearest-neighbor signature. If so, as determined in operation 225, process 200 may transition to operation 235, whereby the RDS and the designator associated with the corresponding signature from the RDB is stored for further processing. If, on the other hand, a match is not found, process 200 transitions to operation 230, whereby the offending RDS is stored for, say, classification and training. The search process continues until RDSs of all sample vectors have been examined, as determined by operation 240.

It is to be understood that a match condition may comprise a simple signature correspondence over one or more energy modalities; however, a match may also involve evaluating more complicated structure. For example, a match may refer only to the recognition of an exact sequence of individual signature features taken from different modalities, such as the drill activation being indicated by a sequence of specific occurrences, e.g., RF arc gap emissions from the switch closing, followed by RF emissions from the motor brush and related acoustic/vibration patterns. The sequence need not, in some embodiments, be exact, thus a match may also comprise a statistical collection of co-occurring modality signatures within a predetermined time period. A match may also comprise recognition of a probabilistic sequence, such as a hidden Markov model, whereby omissions of certain detections by the monitoring process, such as those lost due to noise are overcome.

Upon completion of the search, process 200 may transition to operation 245, whereby RDSs and, where applicable, associated event designators from matched signatures are used to verify proper classification and/or to refine the classification associated with the signature designator. In certain embodiments of the present invention, RDSs of different sensors for which matched signatures were located in the RDB are jointly examined for classification refinement. For example, RDSs for which a signature match was accepted by only a marginal similarity measure may be verified by comparing its designator with that of one or more other matched signatures. Such verification could warrant updating stored signatures to incorporate that of the marginal match.

Figure 3:
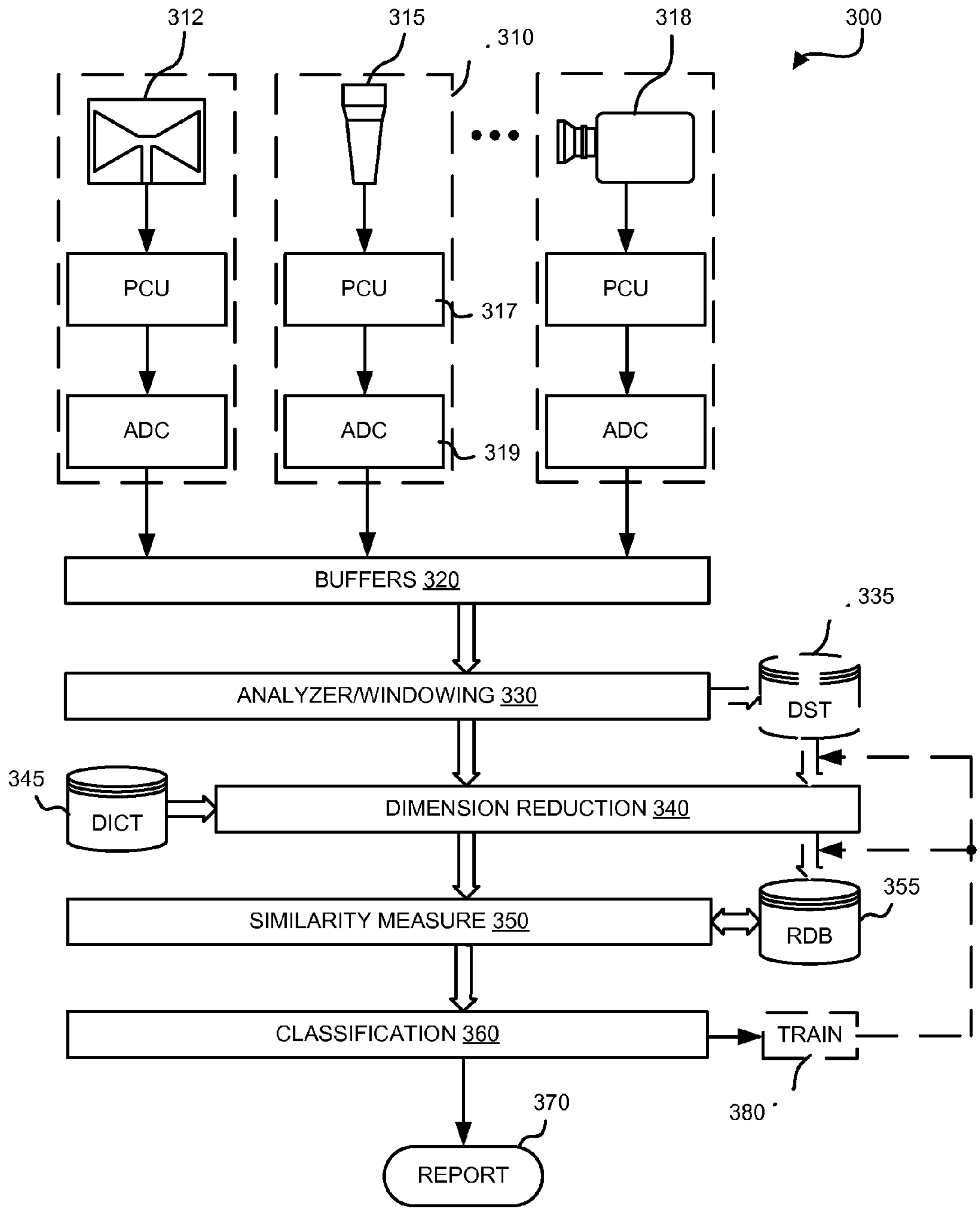
FIG. 3 is a schematic block diagram of an exemplary monitoring system constructed in accordance with the present general inventive concept.

Referring to FIG. 3, there is illustrated a schematic block diagram of a monitoring apparatus 300 implementing aspects of the present invention. It is to be understood that the exemplary components of monitor system 300 are intended to represent functional divisions for purposes of explanation and not limitation. Numerous variations, modifications and alternatives for the components illustrated in FIG. 3, and the functional divisions represented thereby, may be embodied by the present invention without departing from the spirit and intended scope thereof.

As illustrated in the figure, exemplary monitor system 300 includes a plurality of sensor channels 310 to collect energy and to convert the energy into a signal that can be machine-processed. In the example illustrated in FIG. 3, the sensors include a wide-band RF receiver 312 to receive and convert RF emissions, a microphone 315 to receive and convert audio emissions, and a camera 318 to receive and convert electromagnetic energy, such as in the form of light or thermal emissions. Each sensor channel 310 may include a preconditioning unit (PCU), representatively illustrated by PCU 317, to condition and/or otherwise process the raw signals from sensors 312, 315, 318 for conversion into a numerical value. Such conditioning may include, among others, amplification, noise filtering, signal scaling, and modulation and/or demodulation. The present invention is not limited to any particular signal processing applied by PCU 317, although, clearly, the signal output from PCU 317 should be indicative of the energy captured by sensors to 312, 315, 318. Once the signal has been conditioned, the signal may be converted into a series of numbers by an analog-to-digital converter (ADC), such as that representatively illustrated by ADC 319.

The output of each sensor channel 210 is a stream of numerical samples from each ADC 319. The streams may be stored in respective buffers 320 and passed to analyzer/windowing process 330, whereby the streams are segmented into sample vectors so as to capture signal features by which an activity can be identified. In certain cases, such feature capturing is complex in that the signals of interest may be continuous and/or contaminated by background noise. In certain embodiments, received energy exceeding a threshold, as determined from the sample stream, may invoke a time window that defines the length of a sample vector. The length of a sample vector X is established by the sample rate of ADC 219 and the extent of the time window in which the samples were collected. The sample rate and the size of the time window are design parameters of embodiments of the present invention that can be varied per the requirements of the application.

Windowing may be achieved by the activating or inhibiting the output of ADC 319 by a gating signal. However, certain applications may require the capture of the onset transients. In such cases, a continuous scrolling window may be used to encompass a small set of collected samples and, upon a signal transient meeting a predetermined trigger condition, a window of appropriate length may be constructed. Such triggering affords at least approximate temporal alignment where transient signal events are central to a signature. Other triggering techniques may also be used, including signal onset detection gates that coarsely align the window to signal features of interest, simple or dynamic thresholding, statistical thresholding, such as the standard deviation of energy meeting some criteria, or more complicated schemes such as the use of matched filters.

In certain embodiments of the present invention, sample data in buffer 320 are parsed into multiple, overlapping segments, where the size and shift of segmenting windows may be based on signal properties discovered during a coarse detection phase, whereby features of candidate activities are isolated into separate windows for identification. Such properties may be discovered by applying a matched filter to the sample stream stored in buffer 320, where the matched filter outputs a maximum signal when the segment under evaluation is well correlated to a target signal, e.g., one corresponding to an activity of interest. The output of the matched filter may be used to trigger the onset of a window by which the length of a sample vector X may be set.

The present invention is not limited to a particular scheme by which the length or contents of sample vectors X is set. The ordinarily skilled artisan will recognize various methods that can be used in conjunction with the present invention without departing from the spirit and intended scope thereof.

Monitor system 300 may implement a dimension reduction process 340 by which the representation of the vectors X are constructed. Accordance with achievable benefits of the present invention, such reduction allows rapid comparison with similarly reduced training data, whereby activity in ROI 110 can be classified and identified. In certain embodiments of the present invention, signals from multiple and distinct energy modalities can be converted into RDSs by the same reduction process 320. In so doing, comparisons with RDSs of known training signals can be executed in like manner regardless of the energy modality from which the signals are produced. Upon review of this disclosure, as well as the Incorporated Disclosure, the ordinarily skilled artisan may recognize various data reduction methods that are usable with the present invention without deviating from the spirit and intended scope thereof.

Exemplary dimension reduction process 340 obtains data vectors X from analyzer/windowing process 330 and each vector X is dimensionally reduced, such as through the linear combination of scaled prototype functions expressed in equation (1). As illustrated in FIG. 3, DR process 340 is communicatively coupled to a database, referred to herein as a dictionary 345, of prototype functions g(s). Dictionary 345 may take on a variety of forms, as is discussed below with reference to FIG. 4.

DR process 340 may produce an RDS for each vector X obtained from data channels 310. An RDS may contain a list of scaling coefficients $a_i$ and a designator indicative of which prototype function $g_i(s)$ is scaled by that coefficient $a_i$. For example, each entry in dictionary 235 may have associated thereto an index unique to each prototype function g(s) contained therein. When so embodied, an RDS may list one or more coefficient/dictionary index sets. The present invention is not limited to a particular content format for an RDS; the skilled artisan may recognize numerous data structure schemes by which the dimensionally-reduced signal representations may be embodied.

As discussed above, monitor system 300 may undergo a training process to create a database of SRDSs for a range of anticipated signals at the place of deployment. Such training can be performed off-line in a controlled setting, whereby known signals can be collected by a suitable sensor channel 310 and subsequently processed by DR process 340. Alternatively, supervised training can be performed at the place of deployment of monitor system 300. For example, once a monitor system 300 has been installed at a deployment site, technicians may personally monitor ROI 110 and identify events as they occur. RDSs may be constructed via dimension reduction process 340 and associated with the event identified by the technician. Regardless of the training procedure, a database of RDSs may be created, such as is illustrated by RDS database (RDB) 355, containing SRDSs corresponding to the applicable sensor channels 310 and respectively associated activity designators corresponding to the activities on which the RDSs were trained.

As illustrated in FIG. 3, RDSs emerging from DR process 340, representatively illustrated by arrow 232, are provided to similarity measure process 350 by which the RDSs corresponding to the recently acquired set of signals from sensor channels 310 are compared with SRDSs in RDB 355. For example, similarity measure process 350 may search RDB 355 by way of a suitable searching process to locate an SRDS in RDB 355 that is closest, by predetermined similarity criteria, to the RDS under evaluation. If such an SRDS is found in RDB 245, the associated activity indication is output from similarity measure process 350. If no such SRDS is located through similarity measure process 350, the RDS under evaluation is provided as output of the similarity measure process 350 for further processing.

In certain embodiments of the present invention, monitor system 300 includes a classification process 360 by which the signal sources corresponding to the RDS under evaluation is classified. In certain cases, the indication of the activity corresponding to the matching SRDS retrieved from RDB 355 by similarity measure process 350 may be sufficient as classification. However, in certain embodiments of the present invention, data from different sensor channels 310 may be correlated and/or compared to refine the classification applied to the signal from a single sensor channel 310. Classification process 360 may also take appropriate action when similarity measure process 350 does not find an SRDS in RDB 355 corresponding to the RDS under evaluation. Such provisions are described more fully with reference to FIG. 4.

Upon completion, classification process 360 may generate data to report the resulting classification to interested parties. Such a report 370 may be a suitably-formatted transmission over a communication network, whereby it is presented at a remote location. Report 370 may be presented on a display at or in proximity to the place of deployment. Report 370 may be descriptive of the type of activity that was detected or may simply be an alarm when a certain type of activity has been detected. The present invention is not limited to a particular reporting scheme and the ordinarily skilled artisan will recognize numerous reporting techniques that can be used with the present invention without deviating from the spirit and intended scope thereof.

Figure 4:
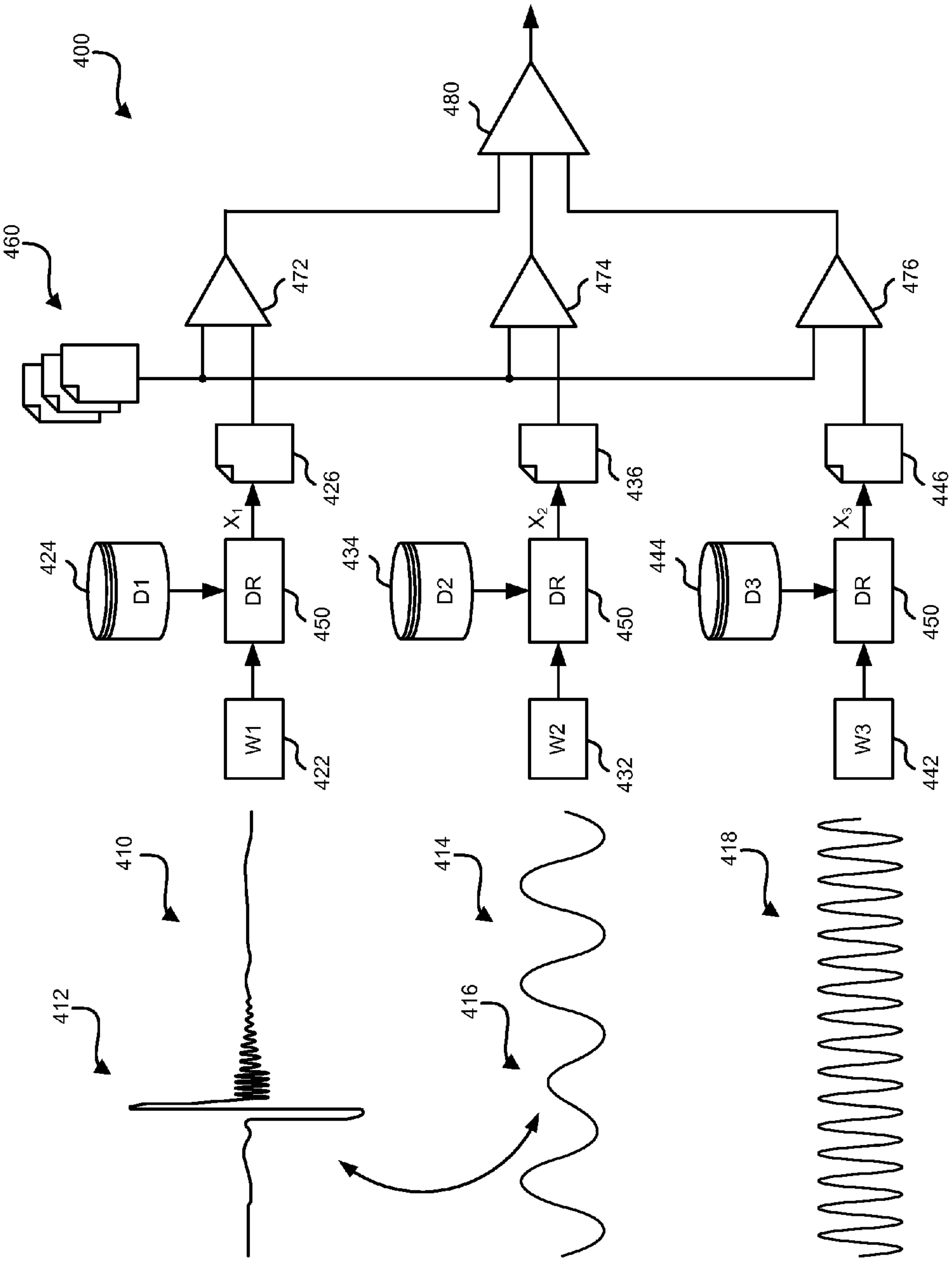
FIG. 4 is a schematic block diagram of an exemplary signature detector constructed in accordance with the present general inventive concept.

Referring to FIG. 4, there is illustrated a schematic block diagram of an exemplary signature detector 400 embodying certain aspects of the present invention. Signature detector 400 may be implemented by components and processes illustrated and described with reference to FIG. 3; FIG. 4 demonstrates similar features of the present invention, but at finer granularity.

For purposes of illustration and not limitation, only three (3) signal examples 410, 414, 418 are presented in the example of FIG. 4 corresponding to only three (3) energy modalities. Signal 410 corresponds to an EM pulse, possibly from the closing of an electrical switch in under load. Signal 414 corresponds to an alternating current, such as in a feed line to the facilities in which the electrical switch was thrown. Signal 418 corresponds to an ongoing audio or vibrational hum within the same facilities. It is to be assumed that signals 410, 414, 418 have been produced by suitable sensing equipment, have been sampled into respective numerical data streams and are stored, at least temporarily, in a suitable buffer. It is to be understood, however, that depending upon the windowing operation, as described below, and the energy sensing technique, buffering of the samples may not be necessary.

The exemplary signals 410, 414, 418 are introduced into respective windowing operations 422, 432, 442, by which appropriately sized vectors are produced. The windowing procedures may be selected from those described above or may be any other windowing operation by which signal features of interest are suitably captured. For example, the data stream produced by a wideband EM receiving sensor may be subjected to a continuously scrolling or sliding windowing operation 422 of a small number of samples while the stream is being buffered. During such windowing, a monitoring operation may detect the onset of a significant change 412 in the signal and may at that point increase the window size. In certain embodiments of the present invention, samples of signal 410 are accumulated in a single sample vector that is terminated when signal activity decreases below some threshold value. Alternatively, windowing operation 422 may be performed such that the data captured in successively constructed signal vectors overlap. Windowing operations 432, 442 may be performed similarly. However, it is to be understood that each of the windowing operations 422, 432, 442 may be independent of one another and may proceed using different techniques. Alternatively, the windowing operation for one sensor channel may rely on data and/or signal levels of another sensor channel. For example, an indication of feature 412 of signal 410 may be conveyed to windowing operation 432, which may then modify its window size and alignment so as to capture signal feature 416 in signal 440.

Whereas a window may refer to means of acquiring a bound number of time-sequenced measurements, a window may also define a data vector acquired in a spatial dimension. For example, a typical camera device provides at each time point a two dimensional matrix of samples. Likewise, an array of antennas or acoustic sensors may provide a vector measurement at each time point. It is to be understood, then, that a window of data may result in a data vector that spans any limited scope of any dimension that is natural to the signal, e.g., a span of time or space, sensor array elements, etc., or any combination of these. Moreover, additional measurements of other energy modes may be included in a combined window of information and each modality may be treated differently from or similarly to other modalities with respect to how data are combined to provide a single vector thereof.

Sample vectors X1, X2, X3, as produced by windowing operations 422, 432, 442, respectively, are provided to DR process 450. For purposes of description and not limitation, it is to be assumed that DR process 450 implements SA to generate signal representations consistent with equation (1). As such, DR process 450 is communicatively coupled to one or more dictionaries 424, 434, 444 of prototype functions.

A dictionary may be a finite or exhaustive set of prototype functions. Such a dictionary may also serve as an index into a larger, even infinite dictionary space of prototype functions. In the latter case, the actual prototype used in any particular reduction operation may be determined by a parametric search of the infinite set starting with a best fit approximation by a prototype function of the index dictionary, as described in the Incorporated Disclosure. In addition, individual prototype function of a dictionary need not be actually stored in a physical medium, but may comprise a group of suitable machine-implemented functions that can be generated as needed for each reduction operation. The prototype functions may be implemented as a parameterized group of mathematical functions, for example, or as a random or pseudo-random sequence of prototypes that can be reliably generated as needed. Prototype functions may be applied in the form in which they are retrieved or generated, or, in some embodiments, a set of prototype functions may be generated from another set of prototype functions, for example, by set operations performed under some constraint such as orthogonality, through a Gram-Schmidt process, for example, or some limiting cost or complexity function. It is to be understood that the present invention is limited neither to a particular set of prototype functions used in a dictionary nor to a particular dictionary implementation.

As illustrated in FIG. 4, sample vectors X1, X2, X3 are reduced through a common DR process 450, but not necessarily through the same dictionary or dictionary space. For example, each of the exemplary dictionaries 424, 434, 444 may be distinct or overlapping sets of index prototype functions into an infinite set of such. However, for purposes of description and not limitation, the will be assumed that dictionaries 424, 434, 444 are set-wise equivalent Gabor dictionary spaces as described more fully in the Incorporated Disclosure.

The output of DR process 450 is an RDS for each signal 410, 414, 418, as illustrated by RDSs 426, 436, 446. Each RDS 426, 436, 446 will be sized according to the number of terms of equation (1) required to adequately represent the corresponding signal 410, 414, 418. As such, RDS 426 may include a larger number of terms that an RDS 436. In certain cases, the signal like that of audio signal 418 may be represented exactly by a single term, i.e., by way of a single modulated Gaussian prototype function. The RDSs 426, 436, 446 may be introduced to a search operation, representatively illustrated at blocks 472, 474, 476, by which a matching to an SRDS from an RDB 460 is sought, such as by the search process described above. A matching signature, if any, may be provided to a classification refinement process, representatively illustrated at block 480. To illustrate the refinement process, it is to be assumed that a wideband EM receiving sensor, for example, is located in a space of ROI 110 in which a variety of EM signal sources resides. For example, the receiving sensor may be deployed in a kitchen in which an electronically-ignited gas stovetop is located. Such a stovetop produces a sequence of sparks to ignite natural gas emitted from a burner. Suppose, too, that a switch is located in the kitchen that activates a circuit on which a substantial load is connected. In such case, the sparks from the stovetop ignition may produce a similar signal feature as a corresponding spark resulting from activating the switch, e.g., the radiation spike 412 in signal 410. However, the stovetop sparks are produced with minimal current and, as such, there is little likelihood that current in the electrical feed circuit, corresponding to signal 414, would be detectably altered. On the other hand, when the switch is thrown to provide current to a heavy load, the inrush current may be detected in the electrical feed circuit, as illustrated at signal feature 416 and signal 414. Accordingly, refinement process 480 may correlate the features 412, 416 of signals 410, 414 to determine that activity in the kitchen corresponds to the switch rather than the stovetop ignition. Further, refinement process 480 may detect that audio signal 418 was not impacted by switch activity in the kitchen. This could signify a number of different scenarios: that the source of the audio hum 418 may not be powered by the electrical circuit to which the heavy load is attached, that an audible sound was not produced by throwing the switch (at least to the extent detectable by the corresponding sensor), etc. As mentioned previously, the combination of signature information, as opposed to any individual signal alone, may be used to provide a match report. The signature relied upon will depend upon the embodiment of the invention. For example, the same two spark types described above might be easily distinguished on the basis of RF signals alone when the embodied inventions is configured to adaptively learn differences in specific emission spectral properties or, even, differences in RF polarization.

In certain embodiments of the present invention, an SRDS may contain dimensionally-reduced data for multiple sample vectors corresponding to the same or different energy modalities. For example, a set of coefficients and indications of prototype functions for signal 410 and a set of coefficients and indications of prototype functions for signal 414 may be contained in a single SRDS. A signature, then, is only said to be matched when an RDS contains the same sets of dimensionally-reduced data and such sets match those of the SRDS within a predetermined similarity measure.

In certain embodiments of the present invention, combinations of sample vectors can be processed in an array by SSA.

Figure 8A:
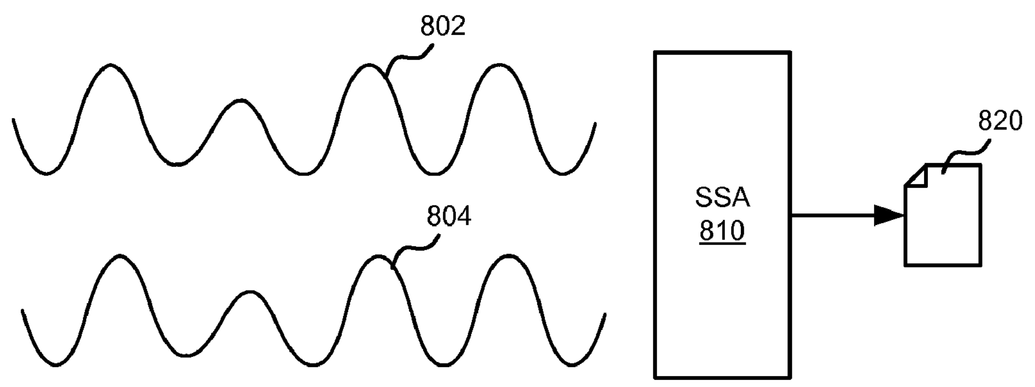
FIGS. 8A-8B are schematic block diagrams illustrating additional signal processing used in certain embodiments of the present general inventive concept.

For example, as illustrated in FIG. 8A, sample vectors from signals 802, 804 of a common energy modality can be combined into a single representation 820 by an SSA processor 810. The joint representation 820 may be more easily matched to similarly formed SRDSs in that event to event variability in signal features may be minimized.

Figure 8B:
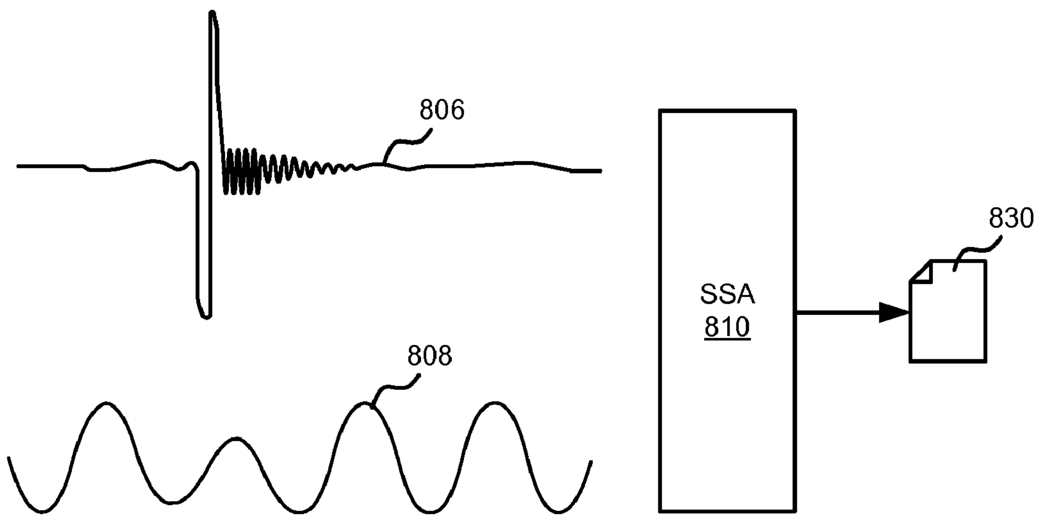

Additionally, as illustrated in FIG. 8B, sample vectors from signals 806, 808 corresponding to distinct energy modalities can be combined through an SSA processor 810 to produce a joint representation 830 of the combination. Accordingly, a signature match occurs only when features of both signals 806, 808 are detected in the region of interest, combined by SSA processor 810 and found similar to an SRDS similarly formed. In accordance with achievable benefits of the present invention, the use of SSA in certain embodiments can be advantageously applied for either discovery of signatures or in co-processing signal vectors to find known signatures in new data. SSA achieves joint approximation of multiple signals by common prototype elements, thereby making apparent hidden commonalities in data that are reliable and consistent across multiple signals, but are not obvious or easily discovered in any one signal instance. To illustrate one difference between SA and SSA, it is to be assumed that each signal vector in a group X is indexed by a super script j, $f^j \in X$. SSA produces a joint approximation for each vector, such that $$f^j(t)=\Sigma_{i=1}^{k} a_i^j g_i^j(s)+\xi, \quad (2)$$

where for each fixed i, the prototypes $g_i^j$ are either identical or closely related by some given constraints, examples of which are given in the Incorporated Disclosure.

All of the different scenarios, including those described with reference to the switch and electronic ignition in the exemplary kitchen, may be represented in one or more SRDSs stored in RDB 460. The population of RDB 460 is set by a number of different scenarios in which signature detector 400 was trained. In certain applications, it can be expected that a signal may be acquired for which signature detector 400 has not been adequately trained. A response to such a condition may be implemented in refinement process 480 as well, which would be invoked upon recognition that a match for the signal under scrutiny was not located in RDB 460. Such a response mechanism is illustrated in FIG. 3 at training block 380. When the present invention is so embodied, signal vectors X may be stored in a data store 335 until such time as the vectors are classified. If, for example, an SRDS matching an RDS of a signal vector X is found in RDB 355, the stored signal vector may be flushed from data store 335. If, on the other hand, it is determined that a match for the RDS of the signal vector X could not be located, the signal vector X in data store 335 and the corresponding RDS are tagged. Report 370 may then include an indication that tagged data have been stored and that training on the stored data is required if such signals are to be recognized and classified by monitor system 300.

Figure 5A:
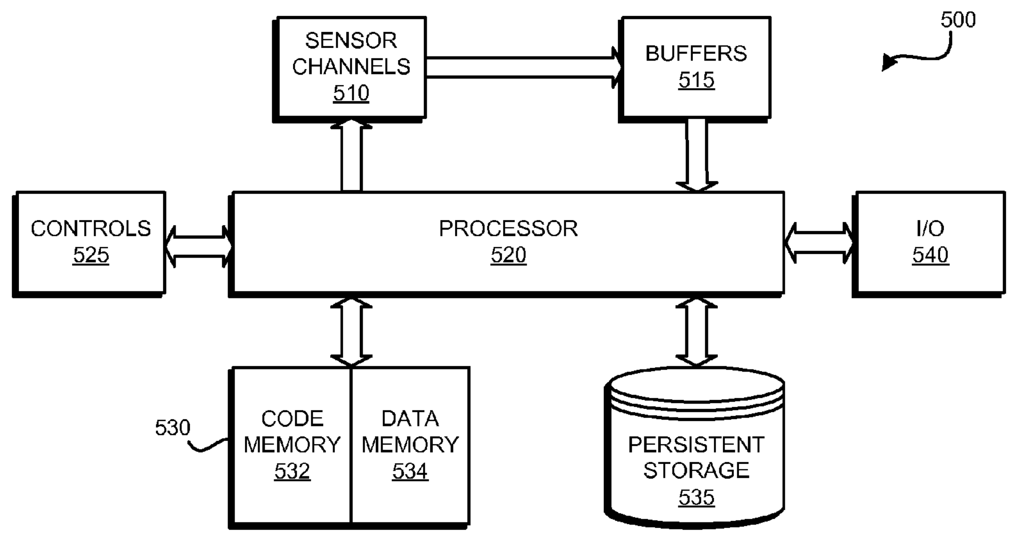
FIGS. 5A-5B are exemplary system configurations by which the present general inventive concept may be embodied.

FIG. 5A illustrates an exemplary system configuration suitable to practice the present invention. An exemplary data processing apparatus 500 of FIG. 5A includes an input/output (I/O) system 540, through which the data processing apparatus 500 may communicate with peripheral devices and/or with external network devices (not illustrated). Data processing apparatus 550 may include controls 525 by which data processing apparatus 500 may be operated and controlled. Such controls may include a display, and one or more Human Interface Devices (HIDs) such as a keyboard, a mouse, a track ball, a stylus, a touch screen, a touchpad, and/or other devices suitable to provide input to the data processing apparatus 500. Alternatively, such a system may operate as an embedded system with no such physical user interface.

The exemplary data processing apparatus 500 of the embodiment illustrated in FIG. 5A includes a processor 520 to, among other things, execute processing instructions that implement various functional modules, such as those described below with reference to FIG. 2B. It is to be understood that the present invention is not limited to a particular hardware configuration or instruction set architecture of the processor 520, which may be configured by numerous structures that perform equivalently to those illustrated and described herein. Moreover, it is to be understood that while the processor 520 is illustrated as a single component, certain embodiments of the invention may include distributed processing implementations through multiple processing elements. The present invention is intended to embrace all such alternative implementations, and others that will be apparent to the skilled artisan upon review of this disclosure.

A storage unit 530 may be utilized to store data and processing instructions on behalf of the exemplary data processing apparatus 520 of FIG. 5A. The storage unit 530 may include multiple segments, such as a code memory 532 to maintain processor instructions to be executed by the processor 520, and data memory 534 to store data, such as data structures on which the processor 520 performs data manipulation operations. The storage unit 530 may include memory that is distributed across components, to include, among others, cache memory and pipeline memory.

Data processing apparatus 500 may include a persistent storage system 535 to store data and processing instructions across processing sessions. The persistent storage system 535 may be implemented in a single persistent memory device, such as a hard disk drive, or may be implemented in multiple persistent memory devices, which may be interconnected by a communication network.

Data process apparatus 500 includes sensor channels 510, such as those implemented as sensor channels 310 in FIG. 3 to produce sample data streams. The data from sensor channels 510 may be stored in respective buffers 515, and retrieved therefrom by processor 520 for processing, such as, among others, the processing described with regard FIGS. 3-4.

Figure 5B:
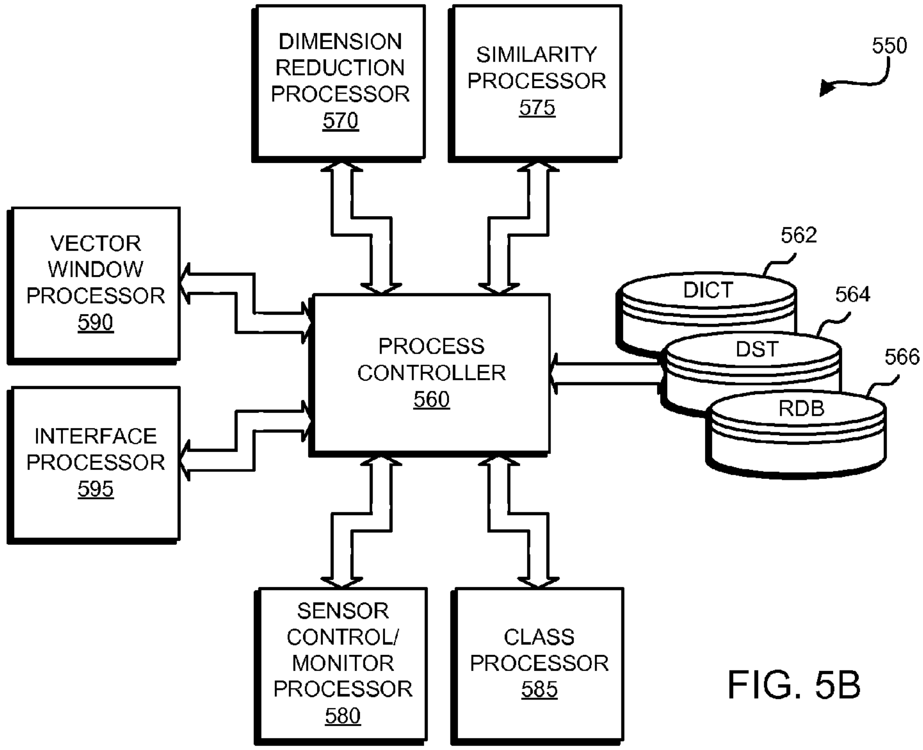

FIG. 5B illustrates an exemplary configuration of functional components suitable to practice certain embodiments of the present invention. The exemplary system illustrated in FIG. 5B may be implemented through processing instructions executed on the processor 520, and in cooperation with other components as illustrated in FIG. 5A, form an exemplary monitor system 550 on the exemplary data processing apparatus 500. The exemplary monitor system 550 may be deployed at ROI 110 to detect and report activities therein.

Monitor system 550 may include a process controller 560 to coordinate and control the interoperations of the functional components of the monitor system 550 so as to achieve a fully operational monitoring system. For example, the process controller 560 may receive processed data from one functional module and forward the data to another functional module, as well as to indicate such processing to a user, such as through I/O unit 540. The process controller 560 may perform other coordination and control operations according to the implementation of the monitor system 550, and such other operations, as well as the implementation of such, can be embodied by a wide range of well-known process control methods and apparatuses. The present invention is intended to encompass all such alternatives of the process controller 560, including multi-threaded and distributed process control methodologies.

Exemplary interface processor 595 implements machine operations embodying controls, protocols, and data conveyance processes by which, among other things, an operator can communicate with and control the monitor system 550 through the I/O unit 540. The ordinarily skilled artisan will readily recognize various communication and user interface schemes that can be used in conjunction with the present invention to achieve user control and communications. Exemplary monitor system 550 includes further a sensor control/monitor processor 580 by which various processes in sensor channels 510 may be controlled. For example, various processing parameters, such as, among other things, signal gain in PCU 317 and sampling rate of ADC 319 may be set or modified by sensor control/monitor processor 580, such as under a command by an operator in communication therewith through interface processor 595. Additionally, sensor control/monitor processor 580 may implement processes by which sensor channels 510 may be monitored for a trigger condition. For example, sensor control/monitor processor 580 may be communicatively coupled to PCUs 317 to detect when a sensor signal exceeds a predetermined threshold. Such triggering may be used to, for example, invoke a windowing process or to temporally align signals for signature detection.

Vector window processor 590 may execute machine operations to implement data windowing of sample data retrieved from buffers 515, such as by the windowing processes described above with reference to FIGS. 3-4. DR processor 570 may execute machine operations to implement a dimensionality reduction process, such as SA, SSA or other techniques usable in conjunction with the present invention and falling within the intended scope thereof. DR processor 570 may receive signal vectors X constructed by vector window processor 590 to form RDSs, such as is described above. Similarity processor 575 may execute machine operations to implement RDB searching and SRDS/RDS matching, such as by the processes described above with reference to FIGS. 3-4. Classification processor 585 may execute machine operations to implement classification and refinement operations such as those described above. Dictionary database 562, data store 564 and RDB 566 may be implemented in persistent storage device 535.

Figure 6A:
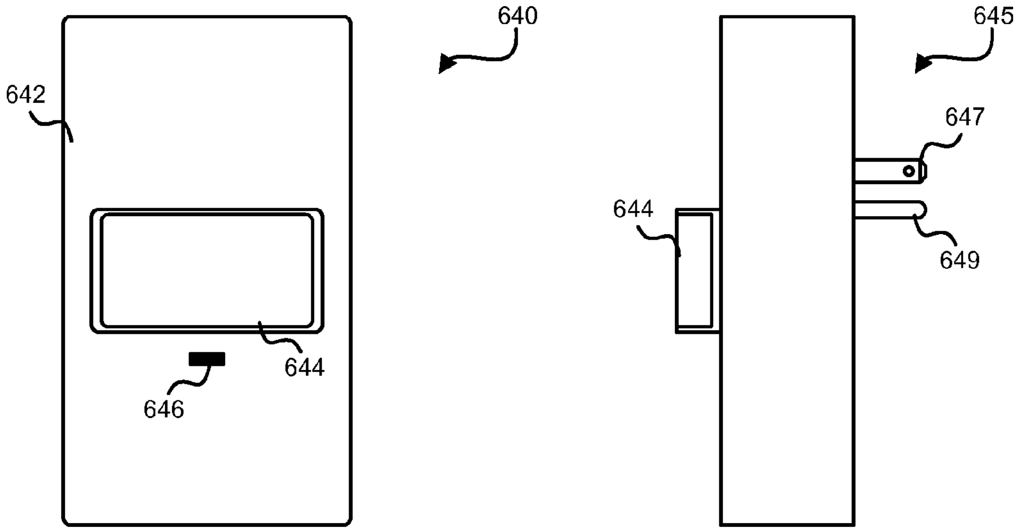
FIGS. 6A-6D are depictions of exemplary modules by which multiple features of the present general inventive concept may be grouped and deployed.

A monitor system such as that described with reference to FIGS. 5A-5B may be assembled in a wide variety of distributions of system components without departing from the spirit and intended scope of the present invention. In certain embodiments of the present invention, various combinations of sensors and other system components may be housed in an easily deployable module, examples of which are illustrated in FIGS. 6A-6D. Referring to FIG. 6A, exemplary module 640 may be contained in a suitable housing 642 to contain the system components while providing access ports through which the sensors thereof can receive corresponding energy. For example, exemplary housing 642 includes an optical port 644 through which light and/or thermal radiation may be transferred to an internal optical sensor, and an audio port 646 through which acoustic energy may be transferred to an internal acoustic sensor. Other access ports may not require a physical aperture formed in the housing 642; housing 642 may be transparent to certain energy forms. For example, housing 642 may be formed of a dielectric material so as to allow RF energy to be transmitted to an inner chamber thereof.

Figure 6B:
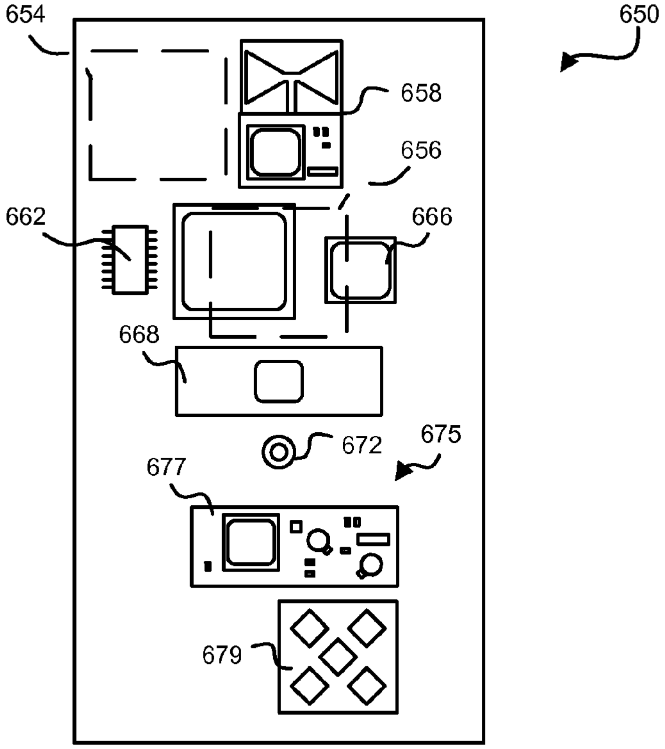

Module 640 may include means by which to receive external power, by which circuitry of module 640, such as is illustrated by circuit assembly 650 in FIG. 6B, can operate. For example, exemplary module 640 includes a standard AC plug 645 comprising power terminals 647 and ground terminal 649. In certain embodiments of the present invention, terminals 647, 649 of AC plug 645 not only connect module 640 to a power source, but may additionally be coupled to sensors by which the external power source may be monitored.

Exemplary circuit assembly 650 may reside in an inner chamber (not illustrated) of housing 642 and may be assembled on a suitable substrate 652 for such circuitry. Circuit assembly 650 may include, among other things, a camera 668 aligned with optical port 644, a microphone 672 aligned with acoustic port 646, a communication system 658, a wideband RF emissions sensor 675 comprising receiver system 677 coupled to an antenna 679 suitable to intercept RF emissions of interest, and an AC current monitor and/or ground monitor 654. Additionally, circuit assembly 650 may include a power supply 656 to provide power to the various circuit elements on substrate 652. Circuit assembly 650 may include a central processing unit 664, random access memory 662, and a persistent storage device 666, such as a solid state memory drive or flash memory.

Figure 6D:
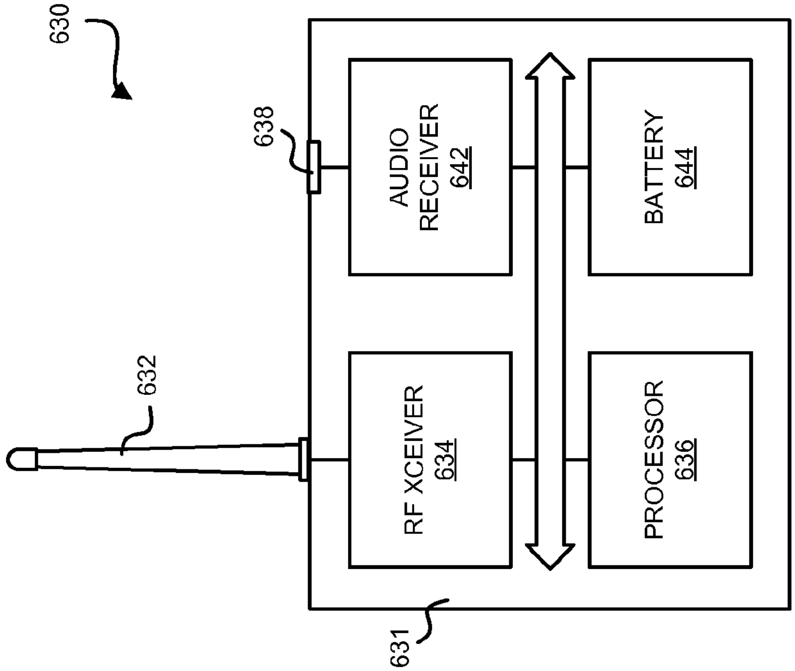
Figure 6C:
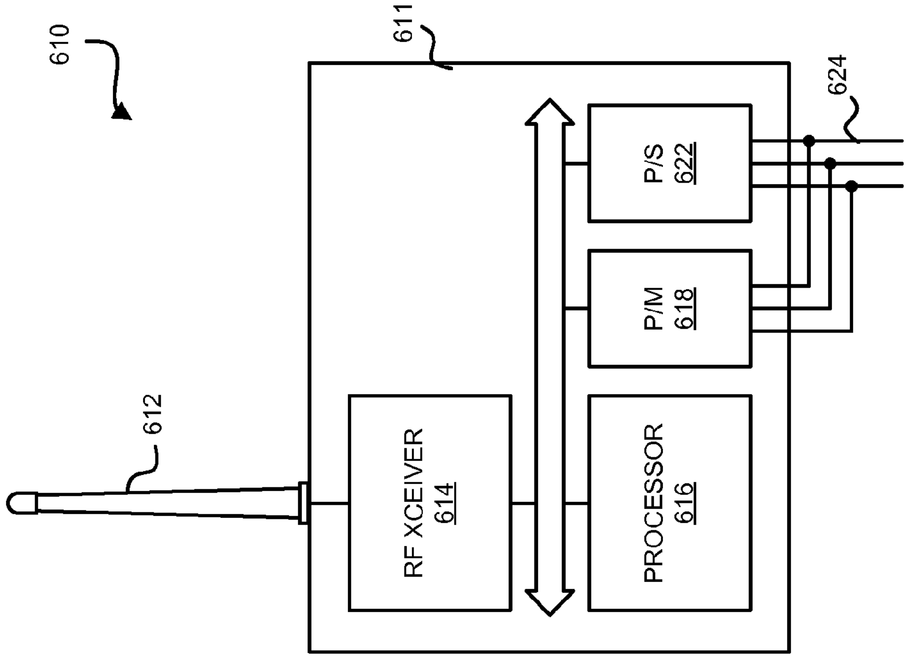

In FIG. 6C, there is illustrated an exemplary module 610 including a housing 611 containing a processing unit 616 executing machine operations implementing training, detection and classification processes, such as those exemplified above. Exemplary module 610 additionally includes a power supply 622 and a power monitor 618. Power supply 622 and power monitor 618 may be electrically coupled to an electrical feed 624, which may be implemented in an AC wall plug, automobile electrical port (lighter) plug, among others. Module 610 further includes an RF antenna 612 coupled to an RF receiver 614, or transceiver if such is also used for external communications. Module 610 may be coupled to a circuit, such as a residential electrical circuit, to detect and classify signatures in electrical and RF energy modalities.

In FIG. 6D, there is illustrated another exemplary module 630 including a housing 631 containing a processing unit 636 executing machine operations implementing training, detection and classification processes and a battery 644 serving as a power source for module 630. Module 630 further includes an RF antenna 632 coupled to an RF receiver 634, which may also be embodied in a transceiver if such is also used for external communications. Additionally, module 630 may include a microphone coupled to an audio receiver 642. Module 630 is self-contained and may be deployed where no other power source is available. Module 630 is configured to detect and classify signatures in RF and acoustic energy modalities.

As is illustrated in FIGS. 6A-6D, the functional components of a complete monitor system constructed in accordance with the present invention, such as is depicted in FIGS. 5A-5B, may be embodied in a relatively small easily deployable module. It is to be understood that such functional components may be contained in a common housing with components of another system, such as a cell phone, music player, tablet computer, to name but just a few. The exemplary monitoring processes described above may be performed by the onboard processing circuitry assembly and reports and/or other data may be transmitted and received through communication circuitry. In certain embodiments of the present invention, communications may be conducted through a wireless transmitter/receiver, such as a WiFi or Bluetooth communication device. It is to be understood that the sensors and supporting circuitry illustrated and described with reference to FIGS. 6A-6D comprise but a few of numerous possible combinations that may be housed in a single module. Sensors and supporting circuitry to process of signals of any combination of energy modality can be housed in a suitable housing, and different such combinations may be deployed throughout a particular region of interest.

It is to be understood that various embodiments of modules 610, 630, 640 can be used not only in detection, but also during the training phase of a corresponding embodiment of the inventive monitoring system. For example, one or more modules can be deployed in a region of interest to collect data corresponding to activities of interest. A technician may perform on-site supervised training by identifying signatures of activities as they are collected by modules 610, 630, 640. A central logging/processing unit may be deployed and operated by the technician, and modules 610, 630, 640 may transmit sample vectors and/or representation data to the central logging/processing unit during initial and refining training phases. Once a monitoring system has been initially trained, modules 610, 530, 640 may be left in place or may be removed from the region of interest if detection by the corresponding energy modalities is no longer required.

In general, on-site training, regardless of the construction of monitoring system, may be supplemented by human observation and correction. Events may be flagged by an observer with time-proximal signal markers corresponding to the timing of the event or onset of an activity and signals of any and all energy modalities detected in association with the event may be grouped for analysis. For example, if the target activity is turning on a light in a particular room, an observer can, for example, activate a user control upon human sensory verification of the activity occurring to indicate that the event of interest has taken place. The observer may situate himself proximal to the location of the event, or may remotely review recording or sensor feeds of the event via telecommunications. Variation in human reaction time, and other delays if known, can be accounted for and correlations between signals corresponding to the energy modalities of interest can be sought in the temporal neighborhood of the activation of the user control.

Figure 7:
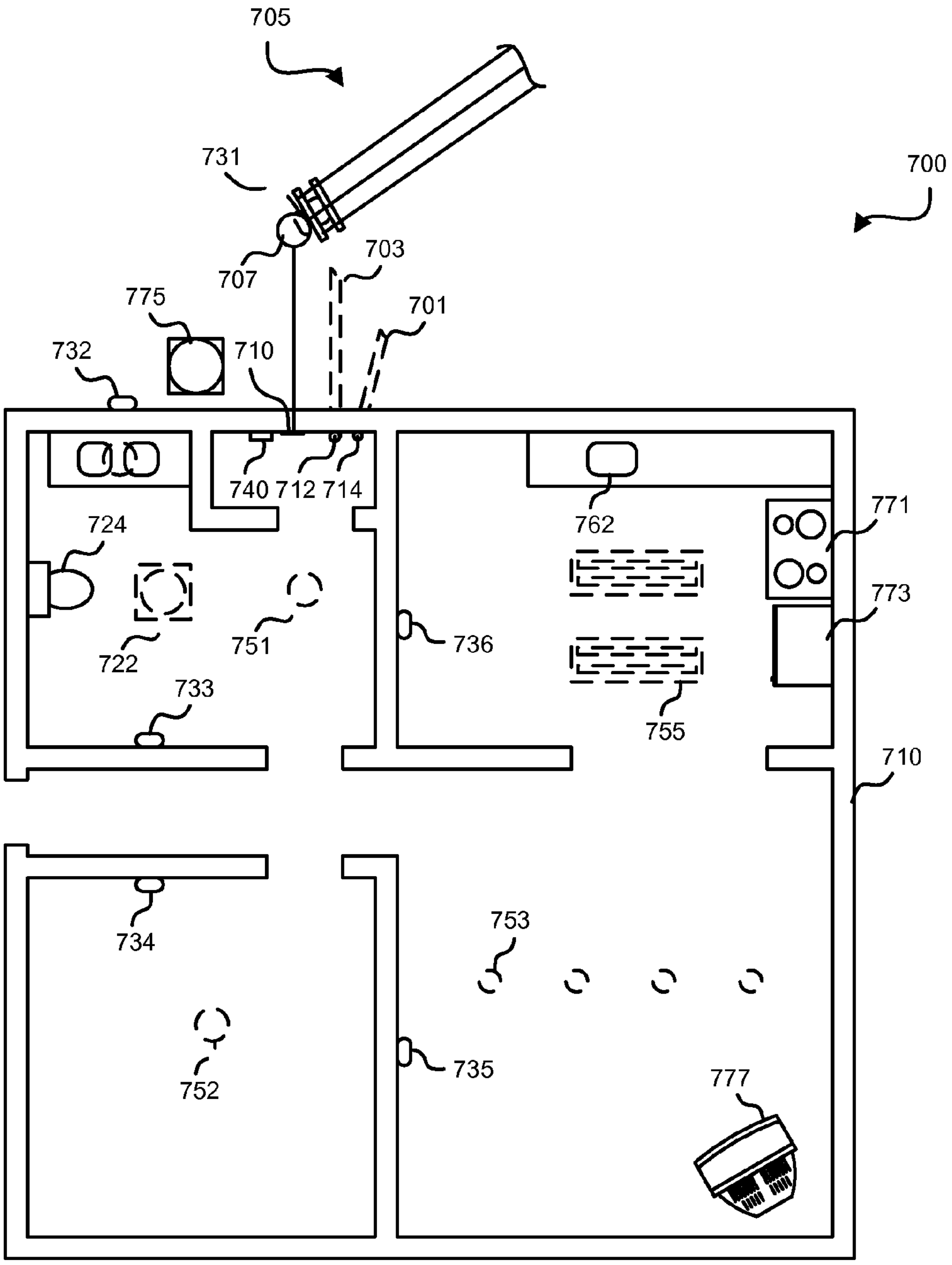
FIG. 7 is an illustration of exemplary residence utilizing a monitoring system constructed in accordance with the present general inventive concept.

In FIG. 7, there is illustrated an exemplary deployment scenario of a monitoring system constructed in accordance with the present invention. The ROI in the illustrated example comprises a typical residential home 700 having a boundary formed by exterior walls 710. However, it is to be understood that similar deployment scenarios can be constructed for vehicles, office buildings, apartments, shipboard quarters, open areas, temporary structures such as tents, and so forth. The residence 700 is provided with several utilities—electrical power through an electrical service feed 705, water through a water service feed 703 and natural gas through a gas service feed 701. Each service feed 701, 703, 705 enters residence 700 in a typical manner to a corresponding distribution point, e.g., a circuit breaker panel 710 for the electrical service, a main water line 712 and a main gas line 714. In the case of the electrical service, a step-down transformer 707 may be located outside the perimeter walls 710 to provide power to circuit breaker panel 710 at residential levels.

As is typical in such residences, a wide variety of appliances is distributed throughout residence 700, each of which being coupled to the distribution point of the corresponding service feed. For example, electrical distribution point 710 may provide power to, among other things, incandescent lights 751, 752, 753, fluorescent lights 755, exhaust blower 722, television set 777, refrigerator 773 and, exterior to the residence, a heat pump 775. Water distribution point 712 may provide water to, among other things, sink 762 and toilet 724. Natural gas distribution point 714 may provide gas to, among other things, stove 771. Throughout the interior and exterior of residence 700, a plurality of sensors 731-736 is deployed so as to capture activity of interest through detection of the corresponding energy emission. Sensors 731-736 may be autonomous modules, such as described with reference to FIGS. 6A-6D, or may be individual sensors communicatively coupled to a suitably located logger/processor 740.

In the scenario depicted in FIG. 7, energy emissions may include those from electrical conductors, such as internal and external wiring, as well as electrical cords providing electrical power to appliances, emissions from switches, various loads and even emissions from a specific individual manipulating particular appliance. Without limitation, sensors 731-736 may include RF sensors, both directional and omnidirectional, acoustic sensors to capture ultrasonic, subsonic, and audible acoustic energy, such as through a microphone or vibrometer, EM sensors to capture EM radiation in suitable frequency or wavelength bands, and electrical power monitors. Power monitors may be implemented through direct wiring to a sensor circuit or through a suitable coupling such as a transformer, optical isolator, magnetic circuits, Hall effect sensors, etc. Sensors 731-736 may be configured to have a dynamic range suitable to detect not only small variations in impinging energy, but also to capture high frequency transients.

Monitoring system in residence 700 may be deployed with the goal to collect and identify signals and signal signatures adequate to determine device usage, occupancy states, human activity, and so forth. Usage patterns of electrical devices may be ascertained through, among other things, emissions resulting from activation and/or deactivation of an electrical appliance. When an electrical appliance is activated, such as heat pump 775, a surge pattern may appear on the electrical power lines, thereby creating electromagnetic emissions, acoustic emissions from vibrating or jumping wires, thermal changes in power wires and circuit breakers, etc. Closing of a switch may generate significant electrical spark-gap arc emissions for a brief period of time as well as acoustic, thermal and even optical transients. Characteristics of an electrical load itself may also be ascertained by appliance-specific emissions. For example, certain appliances and tools will generate various motor emissions, such as those described above, as well as audio signals from tool vibrations and motor hum. Gas stove 771 may include an electronic ignition by which stove use can be identified. Plugging and unplugging equipment from electrical or accessory sockets including for such equipment as headphones and computer peripherals, may also produce emissions that can indicate activity within residence 700. Switching noise and other electrical noise on ground circuits may also be used as part of a signature of interest.

With respect to purely mechanical tools and devices, the primary emissions will generally be acoustic in nature. However, friction between materials may generate not only electrical discharges, but thermal and optical emissions as well. Additionally, acoustic emissions of human activities, such as walking, talking, dressing, cleaning, cooking, sleeping, and so forth may be included as emissions of interest depending on the application of the present invention.

Embodiments of the present invention can be used to track behavioral patterns and device usage patterns of specific individuals. For example, a particular person using, say, a handsaw may generate a characteristic acoustic energy signature distinct from other handsaw users. Additionally, individual persons may have distinct acoustic energy signatures in their style of walking, the manner in which they move from room to room, e.g., how doors are closed, the timing of the switching on of lights upon entry into specific room, etc. Clearly, multiple persons can be tracked in a similar manner at the same time. The present invention can derive initial signatures from laboratory training on activation of light switches, door closing, etc. and the signatures can be adapted to specific individuals over time through on-site training. If a secondary reference, such as a correlating signal associated with a particular event is available to confirm which light is activated or what store is closed and by whom, present invention can report the activities and/or presence of specific individuals as they move about residence 700.

On the other hand, if no independent references are available, then techniques described in the Incorporated Disclosure can be used to resolve a discriminatory feature set on which cluster analysis, for example, or unsupervised learning methods can be used to determine (a) emergent activity classes that can be reliably distinguished from one another and (b) the number of such classes. By combining a number of likely classes with some domain knowledge of the types of differences between similar activities on separate appliances and which sort are likely to be inter-human variations, embodiments of the present invention can readily determine both the number of different appliances and the number of inhabitants in the target environment.

Higher-level tracking information may also be used to classify activities are individuals. For example, sequences of events, e.g., activation of one light followed by the activation of another followed by activation of a door lock, or the sequence of footfalls described above, may be indicative of specific individuals as well. Overlapping and/or simultaneous events, e.g., sitting on a specific chair and turning on television 777, may also used to identify individuals.

Embodiments of the present invention may implement detection and classification for individual devices being used, e.g., vacuum cleaner versus a light versus an electric drill, etc. Embodiments of the present invention may also afford detection and classification of individual people or animals involved in an activity of interest. Additionally, embodiments of the present invention may afford multimodality data fusion to allow one modality to compensate for known limitations of another. For example, system training may be performed with reference to an energy modality that may not be available in the environment during normal monitoring.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A monitoring apparatus to monitor a region of interest for activity, the apparatus comprising:

a plurality of sensor channels to produce numerical sequences proportional to energy of at least two energy modalities transferred to respective sensors thereof during commission of an activity; and a processor to determine whether a known activity is committed by matching dimensionally-reduced representations of the numerical sequences with dimensionally-reduced representations of known numerical sequences containing signal characteristics defined by energy transference in the commission of the known activity, and to provide an indication of the known activity upon positive determination that the match is within a similarity criterion.

2. The apparatus as recited in claim 1, wherein the processor generates the dimensionally-reduced representations of the numerical sequences as combinations of scaled prototype functions and constructs therefrom representation data structures to include an indication of the respective combinations.

3. The apparatus as recited in claim 2, further comprising:

a database of signature data structures, each including an indication of the combinations of scaled prototype functions representing the known numerical sequences; and wherein the processor determines a similarity measure between the combinations of scaled prototype functions indicated in the representation data structures and the combinations of scaled prototype functions indicated in the signature data structures such that the positive determination of the match is indicated by the similarity measure meeting the similarity criterion.

4. The apparatus as recited in claim 3, wherein the signature data structures include respective indications of multiple sets of the combinations of scaled prototype functions, each of the sets representing respective known numerical sequences defined by the energy transference during the known activity, the processor indicating the match upon the similarity measure between the combinations of scaled prototype functions indicated in the representation data structures and the sets of the combinations indicated in the signature data structures meeting the predetermined similarity criteria.

5. The apparatus as recited in claim 4, wherein the processor generates the combinations of scaled prototype functions as sets thereof, each of the combinations in the set being generated from the numerical sequences originating from the sensor channels of at least two distinct energy modalities associated with the commission of the activity.

6. The apparatus as recited in claim 5, wherein the processor generates at least one commonly-defined dimensionally-reduced representation from the numerical sequences originating from the sensor channels of the at least two distinct energy modalities.

7. The apparatus as recited in claim 6, wherein the processor executes a machine implementation of a simultaneous sparse approximator.

8. The apparatus as recited in claim 2, wherein the processor generates at least one commonly-defined dimensionally-reduced representation from the numerical sequences originating from a plurality of sensor channels of a like energy modality.

9. The apparatus as recited in claim 8, wherein the processor executes a machine implementation of a simultaneous sparse approximator.

10. The apparatus as recited in claim 3, wherein the processor revises the dimensionally-reduced representation of the known numerical sequences in the signature data structures with the signal characteristics contained in the dimensionally-reduced representations of the numerical sequences in the representation data structures upon predetermined revision criteria being met.

11. The apparatus as recited in claim 10, wherein the revision criteria include the positive determination of the match.

12. The apparatus as recited in claim 10, wherein the revision criteria include a positive determination that the similarity measure is within a predetermined range.

13. The apparatus as recited in claim 1, further comprising: a housing to contain the sensor channels and the processor.

14. A machine-implemented method for monitoring a region of interest for activity, the method comprising:

forming at least one signature representation containing signature signal characteristics defined by energy transference in committing a known activity;

converting energy transferred during commission of an activity into signals having activity signal characteristics;

comparing at least one representation of the activity signal characteristics with the signature representations to obtain a similarity measure between the activity signal characteristics and the signature signal characteristics, where at least one of the signature representation and the activity signal representation is dimensionally-reduced from an original signal representation domain prior to the comparison; and reporting the activity as the known activity upon a positive determination that the similarity measure meets a predetermined criterion.

15. The method as recited in claim 14, wherein the forming of the at least one signature representation includes:

establishing a dictionary of prototype functions; and forming the signature representation as at least one combination of scaled prototype functions from the dictionary.

16. The method as recited in claim 15, wherein the comparing of the representations includes:

generating the dimensionally-reduced activity representation as at least another combination of scaled prototype functions from the dictionary; and comparing directly the dimensionally-reduced signature representation and the dimensionally-reduced activity representation to obtain the similarity measure.

17. The method as recited in claim 16 further comprising:

storing the combination of scaled prototype functions and the other combination of scaled prototype functions as a data set including indexes into the dictionary of the prototype functions comprising the combination and respective scaling factors applied to the prototype functions of the combination; and wherein the comparing of the dimensionally-reduced signature representation and the dimensionally-reduced activity representation includes:

comparing directly the indexes and the scaling factors of the data set representing the dimensionally-reduced signature representation and the dimensionally-reduced activity representation to obtain the similarity measure.

18. The method of claim 14 further comprising:

distributing sensors at locations in the region of interest to intercept energy of at least two energy modalities; and converting the energy intercepted by the sensors into the signals having the activity signal characteristics.

19. The method as recited in claim 18 further comprising:

establishing numerical sequences as the signature representations of the signature signal characteristics of the at least two energy modalities;

forming an array of the numerical sequences;

generating a joint signature representation of the signature signal characteristics as a dimensionally-reduced representation of the array;

generating numerical sensor sequences from the sensor signals;

forming another array from the sensor sequences;

generating a joint activity representation of the activity signal characteristics from the sensor signals as a dimensionally-reduced representation of the other array; and comparing directly the dimensionally-reduced array and the dimensionally-reduced other array to obtain the similarity measure.

20. The method as recited in claim 14, wherein the generating of the dimensionally-reduced signature signal characteristics and the generating of the dimensionally-reduced activity signal characteristics includes:

executing a machine implementation of a simultaneous sparse approximator to generate the dimensionally-reduced signature signal characteristics and the dimensionally-reduced activity signal characteristics.

21. A machine-implemented method of monitoring a region of interest for activity, the method comprising:

generating training signals to include signal characteristics indicative of commission of a known activity;

collecting sensor signals by each of a plurality of sensors in the region of interest, the sensors being constructed to respond to energy transference in a plurality of energy modalities;

generating representations of the sensor signals of the energy modalities by which similarities thereof to representations of the signal characteristics in the training signals are comparable;

determining whether the signal characteristics are present in the sensor signals from a similarity measure obtained from the representation of the sensor signals and the representation of the signal characteristics of the training signals corresponding to the energy modalities, where at least one of the representations of the signal characteristics of the training signals and of the sensor signals are dimensionally-reduced from that of an original signal representation domain thereof prior to the similarity measure being applied; and indicating commission of the activity in the region of interest upon a positive determination that the similarity measure meets a similarity criterion.

22. The method as recited in claim 21 further comprising:

establishing at least one dictionary of prototype functions;

dimensionally-reducing the at least one of the representations of the training signals and the sensor signals through simultaneous sparse approximation based on the dictionary.

23. The method as recited in claim 22, wherein the establishing of the dictionary includes:

establishing a plurality of the dictionaries; and the dimensionally-reducing the at least one of the representations of the training signals and the sensor signals includes:

dimensionally-reducing the representations of the training signals through simultaneous sparse approximation based on one of the dictionaries; and generating the dimensionally-reduced numeric representations of the sensor signals through simultaneous sparse approximation based on another of the dictionaries such that the similarity measure meeting the similarity criterion is indicative of the commission of the known activity.

24. The method as recited in claim 21 further comprising:

dimensionally-reducing the signal characteristics of the training signals into a reduced representation domain; and wherein the generating of the representations of the sensor signals includes:

forming a numerical signal vector from at least one of the sensor signals of at least one of the energy modalities; and dimensionally-reducing the signal vector into the reduced representation domain.

25. The method as recited in claim 24, wherein the forming of the signal vector includes:

monitoring the sensor signals for a marker signal characteristic; and forming the signal vector from the at least one sensor signal in accordance with a relationship between the commission of the known activity and the marker signal characteristic.

26. The method of claim 25 further comprising:

receiving a data stream containing numerical data corresponding to the sensor signals; and forming the signal vector from the data stream responsive to the marker signal characteristics by:

establishing a window to encompass a segment of the data stream, the window having a length corresponding to a length of the signal vector; and applying the window to the data stream to select the segment thereof as the signal vector.

27. The method as recited in claim 25, wherein the forming of the signal vector includes:

forming a plurality of the signal vectors from the plurality of sensor signals in accordance with respective relationships between the commission of the known activity and the marker signal characteristic; and aligning the signal vectors in accordance with the respective relationships.

28. The method as recited in claim 27 further comprising:

establishing numerical sequences from the signal characteristics of the training signals for the respective energy modalities;

aligning the numerical sequences into an array;

generating a joint signature representation of the signal characteristics of the training signals as a dimensionally-reduced representation of the array;

aligning the signal vectors into another array;

generating a joint activity representation of the sensor signals as a dimensionally-reduced representation of the other array; and the determining of whether the signal characteristics are present in the sensor signals includes:

comparing the dimensionally-reduced array and the dimensionally-reduced other array to obtain the similarity measure.

29. The method as recited in claim 28 further comprising:

establishing at least one dictionary of prototype functions;

generating the dimensionally-reduced array and the dimensionally-reduced other array through simultaneous sparse approximation based on the dictionary.

30. The method as recited in claim 29, wherein the establishing of the dictionary includes:

establishing a plurality of the dictionaries; and the generation of the dimensionally-reduced array and the dimensionally-reduced other array includes:

generating the dimensionally-reduced array through simultaneous sparse approximation based on one of the dictionaries; and generating the dimensionally-reduced other array through simultaneous sparse approximation based on another of the dictionaries.

31. The method as recited in claim 25 further comprising:

identifying the signal characteristics in the generated training signals;

identifying parameters that configure a matched filter in the original representation domain to generate an output signal having an amplitude responsive to a signal provided thereto the maximum of which is generated when such signal contains the signal characteristics therein.

32. The method as recited in claim 31, wherein the monitoring of the sensor signals includes:

providing at least one of the sensor signals in the original representation domain to the matched filter;

monitoring the amplitude of the output signal of the matched filter; and generating the marker signal characteristic upon a positive determination that the amplitude of the output signal of the matched filter exceeds a threshold.

33. The method as recited in claim 31 further comprising:

storing the parameters of the matched filter as the dimensionally-reduced representations of the training signals.

34. The method as recited in claim 21, wherein the generating of the training signals includes:

distributing a plurality of training sensors in a spatial distribution;

committing the known activity such that the energy transferred thereby is intercepted by the training sensors; and identifying the signal characteristics indicative of the commission of the known activity from signals generated by the training sensors; and further comprising:

distributing the sensors in a spatial distribution in the region of interest;

refining the representation of the signal characteristics obtained from the distributed training sensors upon a positive determination that the similarity measure meets the similarity criterion.

35. The method as recited in claim 34, wherein the refining includes:

excluding a signal characteristic from at least one of the energy modalities upon a positive determination that the representation of the remaining signal characteristics is refined in accordance with a refinement criterion.

36. The method as recited in claim 35 further comprising:

removing a sensor corresponding to the excluded signal characteristic from the distribution of sensors in the region of interest.

37. The method as recited in claim 34, wherein the distributing of the training sensors includes:

including in the distribution at least two of the training sensors to intercept the energy of a like energy modality; and the distribution of the sensors includes:

including in the distribution at least two of the sensors to intercept the energy of the like energy modality.

38. The method as recited in claim 21 further comprising:

establishing as the similarity criterion a Euclidean distance metric in a dimensionally-reduced signal representation domain into which the at least one of the representations of the training signals and the sensor signals are dimensionally-reduced.

39. The method as recited in claim 21, wherein the known activity includes that which identifies an actor in the region of interest.

40. The method as recited in claim 21, wherein the known activity includes that which quantifies a number of actors in the region of interest.

41. The method as recited in claim 21, wherein the signal characteristics in the training signals include that by which a location of the activity in the region of interest is identified from the activity signal characteristics.

* * * * *